United States Patent [19]
Nelson

[11] 3,938,320
[45] Feb. 17, 1976

[54] STARTING SYSTEM FOR A HELICOPTER POWER PLANT CONTROL

[75] Inventor: Robert E. Nelson, Indianapolis, Ind.

[73] Assignee: General Motors Corporation, Detroit, Mich.

[22] Filed: July 17, 1974

[21] Appl. No.: 489,264

[52] U.S. Cl. ............... 60/39.14; 60/39.28 R; 416/30
[51] Int. Cl.² ......................... F02C 7/26; F02C 9/04
[58] Field of Search ....... 60/39.14, 39.28 R; 416/27, 416/30

[56] References Cited
UNITED STATES PATENTS

| | | | |
|---|---|---|---|
| 3,691,759 | 9/1972 | Scheerer | 60/39.14 |
| 3,759,037 | 9/1973 | Kiscaden | 60/39.14 |
| 3,844,111 | 10/1974 | Fenton | 60/39.14 |
| 3,858,391 | 1/1975 | Davis et al. | 60/39.14 |

*Primary Examiner*—John J. Vrablik
*Assistant Examiner*—Robert E. Garrett
*Attorney, Agent, or Firm*—Paul Fitzpatrick

[57] ABSTRACT

A control system for a helicopter power plant with three power units driving the lifting rotor system through a main gearbox. Each power unit comprises a gas turbine engine of the gas-coupled type, a hydromechanical fuel control receiving electrical inputs to set a gas generator governor in the fuel control, an engine electronic control, and various engine accessories.

The operation of the power plant is normally controlled by the pilot through condition levers and switches on a control quadrant, through a pitch control by which the collective pitch of the rotor blades is controlled, and through a master beeper switch which is operable to trim the setting of an isochronous governor for the rotor system and the gas generator governors. The condition lever of each engine transmits a speed command signal through the electronic control of each power unit to its gas generator governor. A signal of collective pitch transmitted from the rotor control system to each engine electronic control is another factor in setting the governor.

The power plant includes a power management control, the principal function of which is to equalilze the power outputs of the engines. It also includes the rotor isochronous governor. The power management control receives inputs of rotor system speed command and actual rotor speed and of the torques of the individual engines and transmits a governor trim signal to increase or decrease engine power to the several electronic controls.

All signals are transmitted electrically between the rotor system, control panel, power management control, and engine electronic controls.

A starting system for each engine includes logic circuits to test the operation of the electrical signal transmission system and closure of a fuel shutoff valve as a prerequisite to starting of the engine.

3 Claims, 4 Drawing Figures

3,938,320

STARTING SYSTEM FOR A HELICOPTER POWER PLANT CONTROL

INTRODUCTION

The invention described herein was made in the course of work under a contract with the Department of Defense.

This invention relates particularly to controls for a helicopter power plant embodying a plural number of gas turbine engines. However, many features of the control system may be employed in other environments. The system provides an overall control of the operation of the several engines, coordinating the engines with the operation of the lifting rotor or rotors of the aircraft and with signals transmitted by the aircraft pilot. It provides for division of the load between individual engines, for saftey overrides or shutdowns in the event of casualty, for alternative modes of operation in the event of failure of some portion of the system, and particularly for electrical transmission of signals between various elements of the system which are located at diverse points in the aircraft. This use of electrical interconnectors or "fly-by-wire", as opposed to mechanical rigging or hydraulic controls, for example, reduces weight and increases reliability of the power plant besides facilitating installation.

The principal object of the present invention is to improve controls for a multiple engine installation, particularly in helicopter installations powered by gas turbine engines; a more particular object of the invention is to provide improved start-stop controls for an engine located remotely from the point of control which incorporates checks as to the proper condition of the engine controls effective to inhibit starting when a defect is sensed.

The nature of the invention and its advantages will be clearly apparent to those skilled in the art from the succeeding detailed description of the preferred embodiment of the invention, the accompanying drawings thereof, and the appended claims.

Referring to the drawings, FIG. 1 is a much simplified illustration of a gas turbine powered helicopter.

Figure 1:
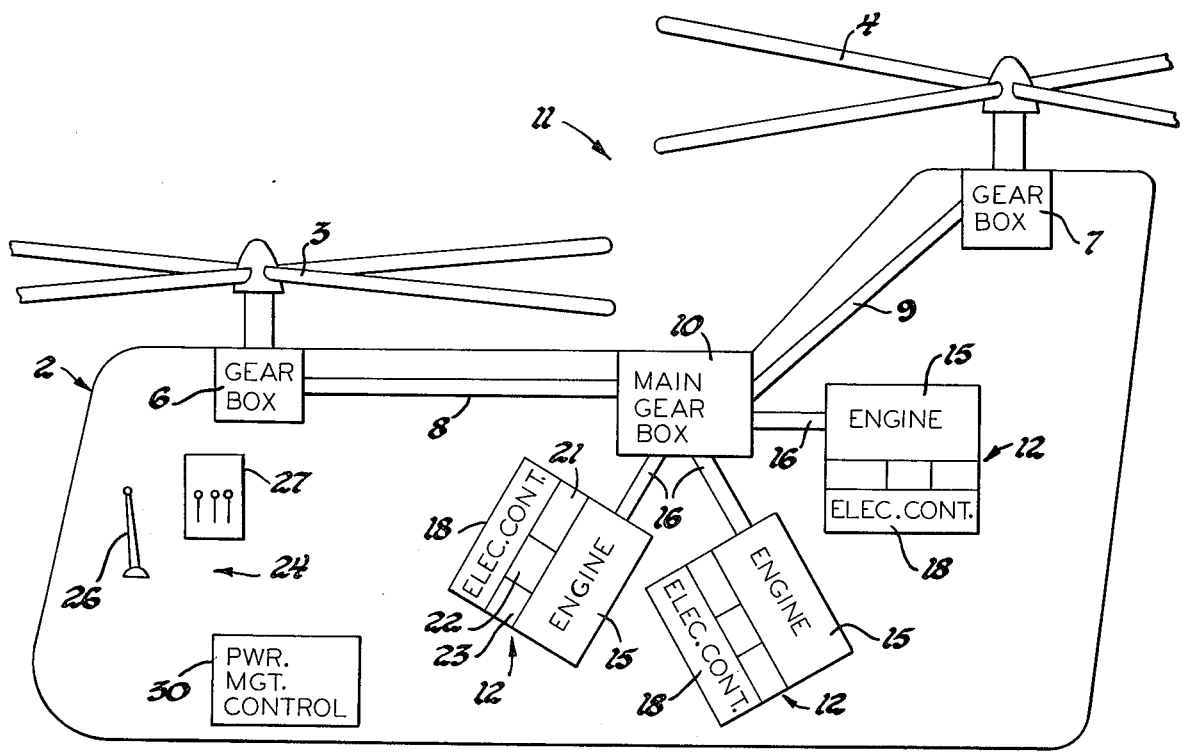

Referring first to FIG. 1, this illustrates a helicopter installation to which the control system of the invention is applicable. This is a highly schematic diagram for orientation, and is not intended as a full description of the actual aircraft installation.

The particular installation for which this control is provided has been described more fully in a paper by J. Roger Alwang and Richard D. McLain entitled "Heavy-Lift Helicopter Engine Control System" presented at the 30th Annual National Forum of the American Helicopter Society in Washington, D.C., May 1974 (preprint No. 870). McCarthy U.S. Pat. No. 3,174,284, Mar. 22, 1965, may also be of interest as to helicopter engine controls.

FIG. 1 illustrates the aircraft so far as is necessary to an understanding of the control system of this invention. A helicopter 2 is of the type having a forward lifting rotor 3 and an aft lifting rotor 4. Rotor 3 is driven through a gearbox 6 and rotor 4 through a gearbox 7. These gearboxes are connected by shafts 8 and 9, respectively, to a main or combiner gearbox 10. The rotors, gearboxes, and shafts are termed the rotor system 11.

Power is supplied to the main gearbox by three power units 12, each of which includes a gas turbine engine 15 delivering power through a shaft 16 to the main gearbox. Each power unit includes also an engine electronic control 18 and various controls and accessories such as a fuel control 21, a compressor variable geometry actuator 22, and a starter 23. Each engine is of the gas-coupled or free turbine type. This means that it includes a gas generator comprising a compressor, combustion apparatus, and a turbine, and a power turbine energized by the discharge from the gas generator. The gas generator turbine and the power output turbine rotate independently, the latter driving the shaft 16. The shafts 16 are suitably geared together and to the rotor drive shafts 8 and 9 in the gearbox 10. An overrunning clutch (not illustrated) is provided between each shaft 16 and the common drive so that the rotor may not be braked by a casualty to an individual engine. Normally, however, the power turbines rotate synchronously as geared together through the main gearing in the box 10.

The aircraft includes a pilot's station at 24 with controls for the aircraft including a stick 26 by which the collective and cyclic pitch settings of the lifting rotor blades are controlled, as is well known. The pilot's station also includes an engine control quadrant or control panel 27 which bears a main control lever called a condition lever for each power unit, as well as other controls and switches to be described.

The other major element of the control system is a power management control 30 which has various functions in the coordination of the operation of the power units, to be described. The electronic controls, power management control, and control quadrant are connected together only by electric wiring (not illustrated in FIG. 1), as will be further described.

The details of the rotor system are immaterial to the present invention, which is equally applicable to a single rotor helicopter, or to other power plants having control requirements comparable to that illustrated.

General Description

Figure 3:
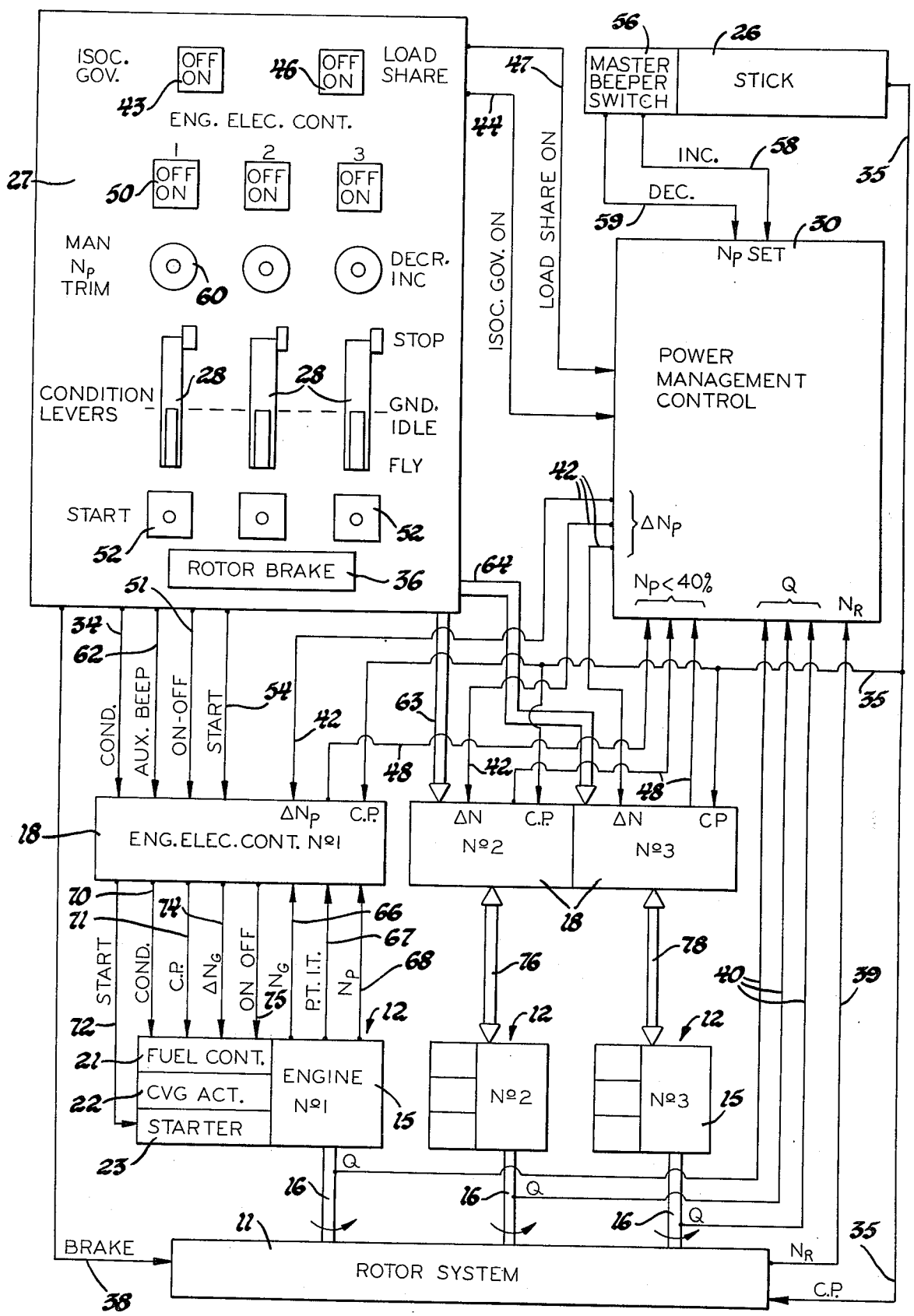
FIG. 3 is a general diagram of the overall power plant control system of the helicopter.

The nature of the interconnections between the major elements of the control system is set out in the system diagram of FIG. 3. It will be noted that the rotor system 11, power plants 12 including the component engines 15, engine electronic controls 18, fuel controls 21, compressor variable geometry actuators 22, and starters 23, are illustrated toward the bottom of the drawing. The control quadrant 27, pitch control stick 26, and power management control are illustrated in the upper part of the figure. As indicated, the control quadrant bears three condition levers 28 which are movable from a Stop position at one extreme to a Ground Idle or Start position at which the engine may be started and operated at minimum power, and further to a Fly or maximum power position at the other end of the range of movement. Engine power may be modulated between the Ground Idle and Fly positions, depending upon the movement of the lever in the quadrant.

The position of the condition lever is transmitted as an electrical signal to the engine electronic control through a line 34. An electrical signal representing collective pitch of the rotors is transmitted by a suitable transducer from the control stick 26, automatic flight control, or other source, through a line 35 to each engine electronic control; and to the rotor system 11 to set rotor collective pitch. Other transmission means to the rotor may be employed and other means of controlling rotor pitch may be employed, but the point with which the control system is concerned is that an electrical signal representing collective pitch is supplied to each engine electronic control.

The control quadrant 27 mounts a rotor brake control 36 which is connected as indicated by line 38 to the rotor drive system to hold the rotor against rotation until the brake is released. There is an interlock to prevent movement of any condition lever beyond Ground Idle until the brake is released. Line 39 represents means for transmission of a lifting rotor speed signal specifically an alternating current the frequency of which is proportional to speed, to the power management control 30. The power management control uses the rotor speed signal as the input to isochronous governing means which establishes the final control of rotor and power turbine speed. A signal representing torque transmitted through the power output shaft of each engine is communicated to the power management control through transmission systems identified as 40. These signals are converted into potentials representing the torque output of each engine in the power management control. The rotor speed and engine torque signals are used to generate a power turbine governor trim signal, indicated as $\Delta N_P$, for each engine. These are transmitted through lines 42 to the respective electronic controls 18. The rotor isochronous governor is normally on but may be turned off by a switch 43 on the control quadrant connected through a line 44 to the power management control. Likewise, the load sharing features of the power management control are normally on, but may be turned off by a switch 46 on the quadrant connected through a line 47 to the power management control. Operation of each torquemeter circuit is inhibited below 40% normal rated power turbine speed by a signal transmitted through a line 48 from each of the engine electronic controls.

Each engine electronic control 18 is turned on by its respective switch 50 on the quadrant connected through a line 51 to the control. The control quadrant also mounts a Start switch 52 for each engine connected through a line 54 to the electronic control to turn on the starter. The starter is cut out by movement of the condition lever to Stop.

The system also includes means for varying rotor speed over a limited range from its normal value by operation of a master beeper switch 56 mounted on the control stick 26. The master beeper switch includes a switch member which is movable in either direction to cause an increase or decrease in rotor speed command. The switch is connected through the lines 58 and 59 marked "increase" and "decrease" to the power management control. The signal from the beeper switch is converted to a signal compatible with those generated to balance power output between the engines, and added to these signals to contribute to the $\Delta N_P$ governor trim signals transmitted through lines 42 to the several engine electronic controls.

There is also an auxiliary beeper or manual $N_P$ trim system by which any individual engine may be trimmed slightly in governor setting under certain conditions. The auxiliary beeper system includes a switch 60 on the control quadrant for each power unit which transmits a signal through lines 62 to the electronic control.

The broad arrows 63 and 64 on FIG. 3 represent transmission of signals to the No. 2 and No. 3 engine electronic controls corresponding to those transmitted to the No. 1 electronic control.

Each engine electronic control 18 receives signals from the stick 26 or other collective pitch control, the control quadrant 27, and the power management control 30 for control of the corresponding engine. It also transmits a signal of power turbine speed below 40% to the engine electronic control. It receives electrical signals of gas generator turbine speed, power turbine inlet temperature, and power turbine speed from the engine as indicated by arrows 66, 67, and 68. The engine electronic control transmits a current signal indicative of condition lever position over a line 70 and a current signal over line 71 indicative of collective pitch. The starter, geared to the gas generator, is energized from the electronic control through a line 72. The governor trim signal indicated by $\Delta N_G$ is transmitted through line 74 to the governor trim of the fuel control. This is a reversable current signal. On-Off electrical signals for fuel shutoff vlave control are transmitted through lines 75 to the fuel control.

The fuel control, which is mounted on the engine, receives inputs of gas generator rpm, engine inlet temperature, and compressor discharge pressure directly from the engine, and is driven by the engine. The compressor variable geometry actuator regulated by the fuel control acts to vary the setting of vanes in the engine compressor.

The broad arrows 76 and 78 represent transmissions between power units Nos. 2 and 3 and their electronic controls corresponding to those indicated specifically for power unit No. 1.

It may be reiterated that all of the communications between the elements indicated by the arrows in the diagram of FIG. 3 are by electric potentials or currents and, therefore, may be transmitted by suitable wiring.

Figure 4:
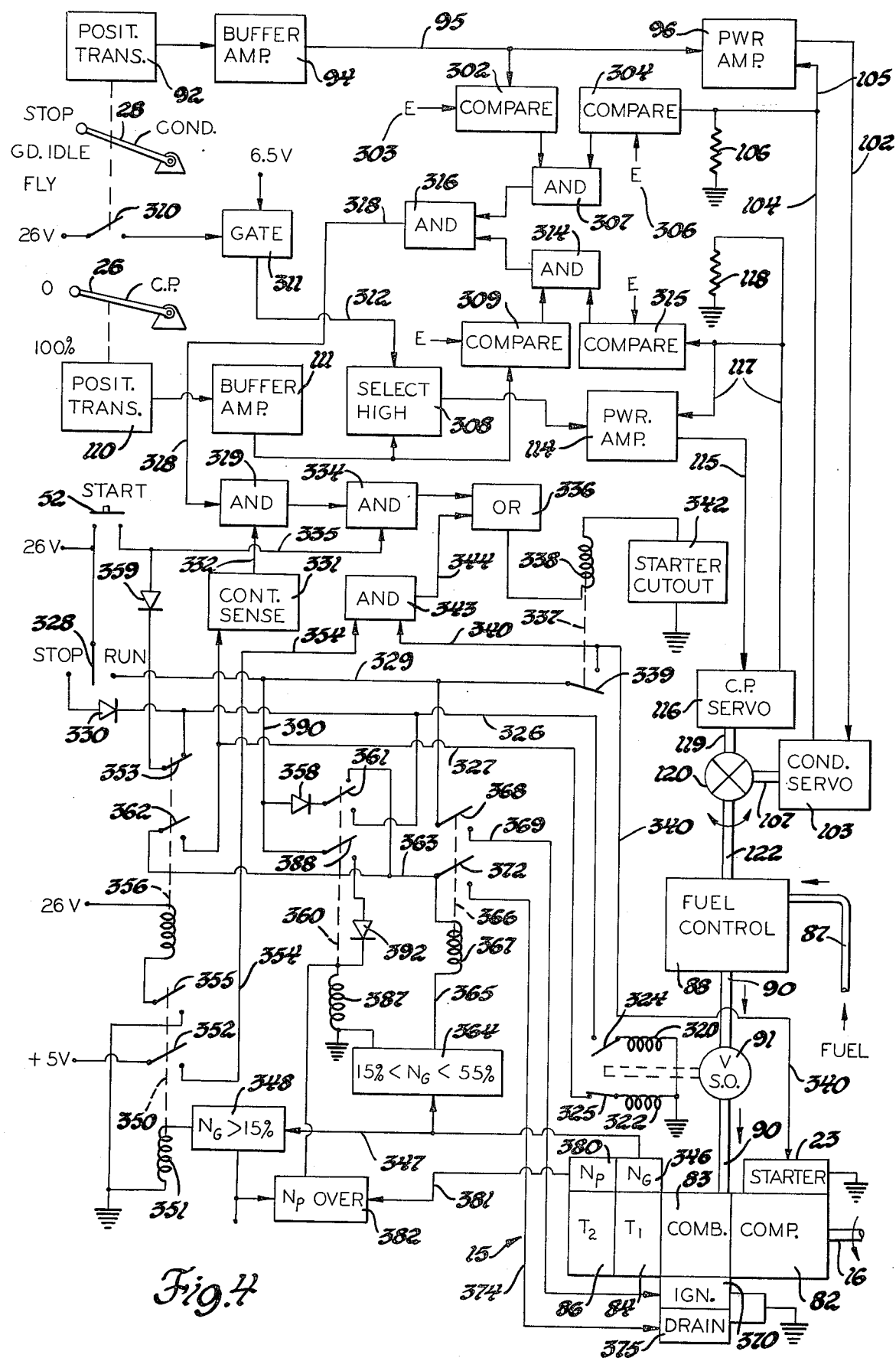
FIG. 4 is a schematic diagram of portions of the control system particularly directed to the start-stop controls for each engine.

Getting now into the relation of the hydromechanical fuel controls to the engines, we refer first to FIG. 4 which illustrates any one of the gas turbines 15 as comprising in flow series a compressor 82, combustion apparatus 83, a high pressure turbine 84 indicated as T1, and a low pressure turbine 86 indicated as T2. The high pressure turbine drives the compressor and the low pressure turbine 86, otherwise called the power turbine, drives the power output shaft 16 which extends through the gas generator comprising elements 82, 83, and 84. As with gas turbine engines in general, the basic control of the engine is by control of the supply of fuel. Fuel is delivered by an engine driven pump (not illustrated) through conduit 87, to the engine fuel control 88. The fuel control includes, among other instrumentalities, a governor 89 driven by the gas generator turbine 84 of the engine. The fuel control contains suitable provisions for determining the amount of fuel allowed to flow to the engine for steady state operation, acceleration, and deceleration, and for returning the excess to the pump inlet by conventional means (not illustrated). The fuel control 88 discharges fuel through a metered fuel line 90 in which is interposed a fuel shutoff valve 91. Valve 91 is opened when it is desired to initiate combustion during starting of the engine and remains open as long as the engine is operating.

We do not attempt here to describe the fuel control in detail, since such details are immaterial to the present invention. A great number of fuel control devices which may be used for the purposes of the present invention are known. The particular control 88 employed in practice of the present invention is manufactured by the Woodward Governor Company of Rockford, Illinois. Some insight into the structure of such engine governors may be had, if desired, from consideration of the following U.S. patents: Plummer U.S. Pat. No. 3,426,777, Feb. 11, 1969; Barnes U.S. Pat. No. 3,442,277, May 6, 1969; and Witt U.S. Pat. No. 3,772,884, Nov. 20, 1973. As with most fuel controls for a gas-coupled gas turbine engine, this device includes a governor rotated by the gas generator turbine which controls a fuel metering valve. The basic speed setting of this governor is determined by an input which loads the speeder spring of the governor. It is also responsive to a second loading which we may call a governor trim or $\Delta N_G$ signal.

The setting of the speeder spring of the governor 89 is effected through servo systems responsive to the settings of the condition level 28 of the particular engine and the collective pitch lever or stick 26 which is connected to all of the fuel controls. As illustrated in FIG. 4, the condition lever 28 is connected to a position transducer 92 which transmits an electrical potential signal representing position of the condition level to a buffer amplifier 94 which transmits a potential signal through line 95 to a power amplifier 96. The position transducer is a commercially available type device which generates a signal that is a predetermined function of the position of the condition lever. One example of such a device is a potentiometer, but more sophisticated devices such as linear-variable differential transformers are preferred. This may be coupled to the condition lever through a non-linear motion transmission linkage.

The power amplifier responds to the potential signal to generate a current which varies with condition lever position. The current is fed through a power lead 102 to a condition lever servo 103 and the current returns to ground through a line 104 and a low resistor 106. The condition lever servo is a torque motor type device which rotates an output shaft 107 proportionally to the current supplied to the motor. A potential proportional to the value of servo current is fed back to the power amplifier through a branch 105 of line 104.

The collective pitch stick 26 is connected through a position transducer 110 and buffer amplifier 111 to a power amplifier 114. The potential signal fed to power amplifier 114 causes transmission of a corresponding current signal through line 115 to a collective pitch servo 116. Current is returned to ground through line 117 and low resistor 118. The potential drop across the resistor provides a feedback of current value to the power amplifier through a branch of line 117. The collective pitch servo also is a torque motor type device which rotates its output shaft 119 as a direct function of collective pitch of the helicopter rotor. Rotations of the shafts 107 and 119 are added in a mechanical differential gear 120 which rotates a shaft 122 entering the fuel control 88 and coupled through suitable mechanism to the speeder spring of the gas generator turbine governor. It will thus be seen that the setting of this governor is a function of the position of the condition lever and of rotor collective pitch.

Figure 2:
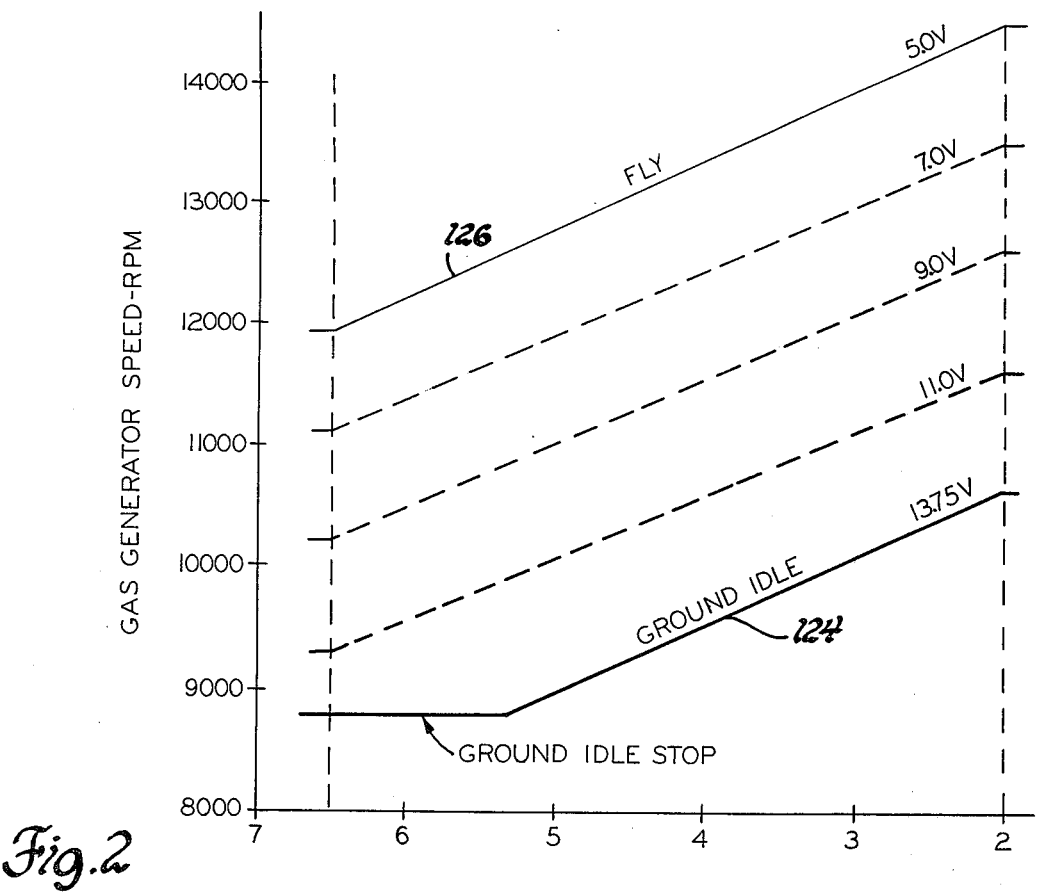
FIG. 2 is a chart illustrating the effect on gas generator governor speed setting of condition lever and collective pitch inputs.

The effects of the collective pitch and condition inputs to the fuel control are shown in FIG. 2. This is a plot of gas generator speed as a function of collective pitch input and the condition lever input. The condition lever input is represented by a family of lines, the lowest line 124 of which is identified as "Ground Idle" and the uppermost 126 as "Fly". The collective pitch input from transducer 110 and buffer amplifier 111 varies over a range from 6½ volts for minimum pitch down to 2 volts for maximum pitch. The input from the condition lever transducer 92 and buffer amplifier 94 varies from 13.75 volts with the condition lever at ground idle position down to 5 volts with the condition lever at the maximum or Fly position. Thus, gas generator governor setting is increased as the condition lever is moved from Ground Idle toward the Fly position and as the collective pitch lever is moved from flat pitch toward maximum pitch. The input from the collective pitch lever anticipates and approximately compensates for the load added to or substrated from the engine by charges in rotor pitch. The condition lever input normally is set to Fly; that is, to call for maximum condition lever speed input, and the speed is then trimmed by other instrumentalities. However, the condition lever may be used as a means to control the power output of the engine between Ground Idle and Fly by movement of the condition lever. The minimum gas generator speed setting is approximately 8800 rpm in this particular case as determined by a fuel metering valve minimum flow stop. Of course, the values of speed and voltage set out are merely those selected for this particular engine and aircraft installation, and might be different for other cases. It is considered highly desirable, however, to have the control potential decreased for increasing rotor pitch and for increasing power setting of the condition level, since this results in a fail-safe condition where interruption of power in the electrical system tends to produce maximum power from any engine, and maximum rotor pitch. If not corrected in other elements of the system, as later discribed, the pilot may correct any error.

Start-Stop Controls and Logic

The control system includes various interlocks to assure proper conditions in the controls prior to starting each engine and to provide proper sequencing of events during starting of each engine. It also includes emergency stopping means responsive to overspeed. We may now refer to these, with particular reference to FIG. 4.

First, with respect to the transmission of control signals to the condition servo and to the collective pitch servo, specifically the preferred values of constants: The position transducer 92 and buffer amplifier 94 deliver a signal which equals 15 volts minus 0.1 volts for each percent of lever movement, thus covering a range from 15 volts at zero movement down to 5 volts at 100%. The signal from the position transducer on the control quadrant is transmitted to the engine electronic control which includes the buffer amplifier and power amplifier to drive the condition lever servo of the particular power unit. The power amplifier 96 generates a current which is a linear function of the input potential; specifically, in the described example, this varies from 120 milliamps for zero condition lever position to zero $mA$ for 100%. This is a fail-safe feature since, if the power amplifier transmits no current or the leads to the condition servo break, for example, the condition servo remains in the 100% or full power position. The current return from the condition servo is grounded through a 20 ohm resistor 106 so that a potential is fed back to the power amplifier varying linearly from zero at zero mA to 2.4 volts at 120 mA. It constitutes a feedback to the power amplifier which regulates the current to balance this feedback against the input potential from line 95, as will be readily understood.

To check the operation of the condition lever servo circuits, the potential signal on line 95 is fed to a comparison circuit 302 which also receives an emf from a controlled source 303 of 13.3 volts representing 17% power lever position. The feedback potential from resistor 106 is supplied to a comparison circuit 304 which also receives an emf from a source 306 of 2 volts corresponding to the 17% position (100 mA servo current). If the signals transmitted are not less than the reference signals indicated by 303 and 306, the comparison circuits transmit positive signals to an AND gate 307. Signals are not less than the reference indicates that the condition lever and servo are not beyond the 17% in range of movement from OFF. The AND gate determines that the check conditions for operation of the condition servo circuit have been met.

There is a similar circuit, with some additions, for transmission of the signal from the collective pitch lever to the collective pitch servo. In this case, the position transducer 110 controls a buffer amplifier 111 (one for each power unit) which transmits a signal of 6.5 volts minus 0.045 volts per percent of lever movement from zero rotor pitch to a select high gate 308 and a comparison circuit 309. An additional signal to gate 308 originates in a condition lever switch 310 which is closed only when the condition lever is at ground idle or lower and is opened when the condition lever is moved past ground idle to call for additional power from the engine. The resulting 26 volt signal is the enabling signal for a gate 311 which has an input of a controlled potential 6.5 volt signal. When switch 310 is closed, it enables transmission of the 6.5 volt signal through a line 312 to the select high gate 308. This 6.5 volt signal is the signal for zero rotor collective pitch. Thus, if the collective pitch lever has mistakenly been advanced beyond zero pitch position, the signal on line 312 will override that sent by the buffer amplifier 111 to the select high gate 308. When the condition lever is moved beyond the ground idle position, this signal in line 312 is turned off and the signal from the collective pitch lever is in control of the selective pitch servo.

Checking logic for the collective pitch circuits is as follows: The comparison circuit 309 compares the collective pitch signal from buffer amplifier 111 with a control input of 2 volts and provides an output to an AND gate 314 unless the buffer amplifier output is less than 2 volts. The fourth comparison circuit 315 receives a potential feedback through a branch of line 117 proportional to collective pitch servo current and a controlled reference potential of 2.4 volts. This circuit provides an output to AND gate 314 if the collective angle servo current is not less than 120 milliamperes, which is the current value corresponding to zero rotor pitch. Thus, if the potentials transmitted by the buffer amplifiers to the power amplifiers check out and if the currents supplied by the power amplifiers to the servos 103 and 116 check out, the two AND gates 307 and 314 will be satisfied and both will transmit positive signals to a third AND gate 316. AND gate 316 under these conditions delivers a positive signal to a line 318 which may be termed a No Start Fault signal. It indicates that the condition and collective servo circuits are operating properly. This signal is communicated to another AND gate 319.

AND gate 319 is a part of logic to prevent initiation of the starting cycle unless the fuel shutoff valve 91 is closed. This valve must open to start the engine, but until the engine is at an appropriate speed, it must remain closed. This valve is closed in proper operation of the system when the engine is shut down. However, it could be opened as a result of some interference by engine repair workers during shut down of the engine. This means its proper closure should be checked.

To explain this, a brief description of the valve is required. Valve 91 has only two operating positions, fully open and fully closed. To close the valve, a solenoid coil 320 is energized; to open the valve, a coil 322 is energized. These solenoid coils effect the physical movement of the valve from open to closed position and from closed to open position, respectively. The mechanism also includes limit or cutout switches, a switch 324 in series with coil 320 and a switch 325 in series with coil 322. When the valve is open, switch 324 is closed to complete a circuit to the closing coil 320. When the valve is closed, switch 325 is closed and switch 324 is open. This opens the circuit to the closing coil and makes the circuit to the opening coil 322. These coils are connected to ground and are connected through the switches to a valve closing coil energizing line 326 and a valve opening coil energizing line 327.

The valve closing line 326 has two sources of energization; one is a stop-run switch 328 supplied from the 26 volt power supply which closes on a Stop contact when the corresponding condition lever is moved to Stop. It is closed on a Run contact whenever the condition lever is moved away from the Stop position. Thus, with the condition lever in the Stop position, the circuit is closed from the 26 volt supply through switch 328 and a diode 330 to the valve closing line 326. This assures shutdown of the engine by shutting off the fuel upon movement of the condition lever to Stop. Line 326 is also energized upon overspeed of the engine, as will be explained.

Before starting of the engine is initiated, the condition lever is at Stop and, therefore, the valve closing line 326 is energized. If the valve is already closed, the switch 324 is open, but if the valve is open, switch 324 is closed and the coil is energized to close the valve. When the valve is closed, the switch 324 opens and switch 322 closes to connect line 327 to ground through coil 322. This closed condition is checked by a continuity sensing circuit 331. This circuit includes a resistor fed from a source of potential and means for sensing the potential downstream of the resistor. If the shutoff valve 91 is closed and, therefore, switch 325 is closed, a low potential is sensed because of the voltage drop through the resistor connected in series with the coil 322 to ground. This sensing current, of course, is far below that necessary to operate the valve. If the switch 325 is open, indicating that the valve is open, a high potential is sensed (no drop in the resistor) and the continuity sensing circuit discriminates. Thus, if the valve 91 is closed, the continuity sensing circuit provides a plus input to the AND gate 319. A plus output from this gate therefore signifies that there is a No Start Fault signal on line 318 and a fuel shutoff valve closed signal on line 332.

The result is transmitted to a still further AND gate 334. The other positive input of this AND gate is provided when the Start switch 52 on the control quadrant for a particular power unit is closed. Closing this switch puts 26 volts through line 335 to the other input of AND gate 334. The output of the AND gate is communicated to an OR gate 336 which controls energization of coil 338 of a starter relay 337. At the time starting is initiated, the other input of the OR gate is off; it is a holding circuit which becomes effective only after gas generator speed reaches 15%. Therefore, the starter relay 337 may be energized only if all of the conditions determined by the comparison circuits 302, 304, 309, and 315 are correct, the fuel shutoff valve is closed, and the Start switch 52 is closed. With these conditions satisfied, coil 338 is energized to cause the starter to operate. This alone is not sufficient to initiate a starting cycle of the engine, but is sufficient to motor the engine with the starter.

Specific means for energizing the starter are immaterial. Ordinarily, the starter is an air-operated motor and it requires opening of an air valve to energize the starter. As indicated schematically here, the starter is energized by the circuit from 26 volts through condition lever switch 328 in the Run position, front contact 339 of the starter relay, and energizing line 340 to the starter 23. The circuit through the coil 338 is completed through a starter cutout 342 to ground. The nature of this device is immaterial. It will be sufficient to state that it serves to terminate energization of the starter upon completion of the starting cycle or upon failure to start by breaking the circuit through relay coil 338 and allowing contact 339 to open.

The Start switch 52 must be held closed until the gas generator reaches 15% speed, after which the starting cycle may only be interrupted by operation of the starter cutout or by return of the condition lever to the Stop position. The energizing line 340 to the starter or starter air valve also provides one of the inputs to an AND gate 343. The output of the AND gate through line 344 is the other input to starter energizing OR gate 336. The other input to AND gate 343 is energized at 15% gas generator speed.

The engine includes a gas generator speed transducer or transmitter 346 which could be any suitable tachometer generator driven by the gas generator. Preferably, a toothed wheel and pickup generate an emf of frequency proportional to gas generator speed. A conversion circuit derives from this a DC emf proportional to speed. This is supplied to cockpit indicators (not illustrated) and to discriminating circuits for control of the starting sequence. The DC signal is transmitted through a line 347 to a gate or discriminator 348 which connects the 26 volt power supply through coil 351 of a relay 350 to ground. Energization of the relay to response to gas generator speed above 15% connects a plus 5 volt input through front contact 352 of the relay and line 354 and to the AND gate 343. Thus, with the starter energized and gas generator speed reaching 15%, the second input to the OR gate 336 is present. The input through Start switch 52 may be discontinued, and the starter will continue to operate.

When gas generator speed reaches 15%, relay 350 also closes its contacts 355 to energize a relay 356, the circuit being from 26 volt power supply through coil 357 of the relay and contact 355 to ground. This completes a circuit from the Run power line 329 through a diode 358 and back contacts 361 of a power turbine overspeed relay 360 to energize the fuel shutoff valve opening circuit. Relay 360 is deenergized except when power turbine speed is excessive, so there will be a circuit from line 329 through diode 358, back contacts 361, line 363, and front contacts 362 of relay 356 to line 327, through closed switch 325 and coil 322 to open the fuel valve. When the valve opens, this circuit is broken at switch 325. Relay 356 also opens the circuit from "Start" line 335 through diode 359 and its back contacts 353 to the valve closing line 326.

Now, the ignition is turned on and the fuel drain valve is closed by a gate or discriminating circuit 364 which receives the gas generator speed signal and closes a circuit to coil 367 of a relay 366 when gas generator speed is in the range from 15% to 55% of rated. Circuit 364 grounds a line 365, thus completing a circuit from Run line 329 through diode 358, contacts 361, line 363 coil 367, and line 365 to ground. Energizing relay 366 closes front contacts 368, completing a circuit from the Run line 329 through a line 369 and a fuel igniter 370 to ground. Any other suitable arrangement may be used to energize the igniter through the 15% to 55% gas generator speed range.

Also, during this range of gas generator speed, front contacts 372 of relay 366 complete a circuit from line 363 to a line 374 which energizes the fuel drain valve solenoid 375. This fuel drain valve is a conventional element of gas turbine engines. It may be held closed either by a current or by air pressure in the combustion apparatus. When the engine is started, it is open to allow any fuel remaining in the combustion apparatus to drain. It is closed at 15% speed as just described. When the gas generator has reached 55% speed, the pressure will hold the drain valve closed until the engine is shut down and has come nearly to a stop. At 55% speed, the ignition and the drain valve solenoid are deenergized by operation of gate 364 to interrupt the circuit through relay coil 367. At this point the engine may be in self-sustaining operation; and at some point in the cycle the starter is cut out, allowing the engine to continue to accelerate under its own power.

This completes the starting cycle of the engine, and it should run until shut down. The engine may be shut down by moving the condition lever to Stop, which not only reduces fuel but energizes line 326 to close the fuel shutoff valve 91. The fuel control may also include a shutoff valve operated mechanically by operation of the condition lever input to the control, but this is immaterial.

The operation of the control to stop the engine in case of overspeed depends upon a power turbine overspeed discriminating circuit. A power turbine speed transducer 380 transmits a speed signal through line 381 to an overspeed detection circuit 382. The details of this circuit are immaterial here. Various circuits for the purpose are known. When imminent or existing overspeed is sensed by comparison circuit 382, it connects the 26 volt power supply through coil 387 of overspeed relay 360 to ground. The relay thus closes its front contacts 361 to complete the circuit from the Run line 329 through diode 358 to the fuel valve closing line 326. It also closes front contacts 388 to complete a holding circuit for the relay coil from the Run line 329 through branch line 390, contacts 388, a diode 392, and coil 387 to ground. The overspeed relay thus remains energized until the circuit is deenergized by returning the condition lever to Stop to open the Run

Conclusion

It should be apparent from the foregoing detailed description that the preferred embodiment of this invention contributes valuable features to a remotely controlled engine installation in which the engines are electrically controlled. The logic circuits are effective to detect malfunctions in the remote control or "fly-by-wire" circuitry. The inclusion in the logic of means for verifying the closed condition of the fuel shutoff valve may avert engine damage due to premature admission of fuel from the fuel control before ignition is turned on.

The logic system is particularly conveniently integrated with the remote control system for the power plant. By the employment of semiconductor electronic devices, the bulk and weight of the controls is minimized and their reliability is at a very high level.

The detailed description of the preferred embodiment of the invention for the purpose of explaining the principles thereof is not to be considered as limiting or restricting the invention, since many modifications may be made by the exercise of skill in the art.

I claim:

1. A control system for a combustion engine adapted for remote power control and starting and stopping of the engine comprising, in combination, engine control means generating a power output level command signal, load control means generating a load control signal effective to vary the power requirement of the load driven by the engine, fuel control means for the engine effective to meter fuel to the engine to control engine power level, a first servomechanism operative to adjust the fuel control means in response to the power output level command signal, a second servomechanism operative to adjust the fuel control means in response to the load control signal, means responsive to the power output command signal effective to transmit a first driving signal to the first servomechanism, means responsive to the load control signal effective to transmit a second driving signal to the second servomechanism; starting means connected to the engine operable to start the engine; and a fault detecting logic system connected to the two said signal generating and the two said signal transmitting means so as to receive the four said signals operative to compare the level of each of the four said signals with a corresponding preset signal level and connected to the starting means so as to inhibit starting of the engine upon detection of an undesired level of any of the four said signals.

2. A control system for a combustion engine adapted for remote power control and starting and stopping of the engine comprising, in combination, engine control means generating a power output level command signal, load control means generating a load control signal effective to vary the power requirement of the load driven by the engine, fuel control means for the engine effective to meter fuel to the engine to control engine power level, a first servomechanism operative to adjust the fuel control means in response to the power output level command signal, a second servomechanism operative to adjust the fuel control means in response to the load control signal, means responsive to the power output command signal effective to transmit a first driving signal to the first servomechanism, means responsive to the load control signal effective to transmit a second driving signal to the second servomechanism; starting means connected to the engine operable to start the engine; an engine fuel shutoff valve; means operable to open and close the fuel shutoff valve; means operative to verify a closed condition of the fuel shutoff valve; and a fault detecting logic system connected to the two said signal generating and the two said signal transmitting means so as to receive the four said signals operative to compare the level of each of the four said signals with a corresponding preset signal level and connected to the fuel valve closed condition verifying means, the said logic system being connected to the starting means so as to inhibit starting of the engine upon detection of an undesired level of any of the four said signals and also when the fuel valve is not in closed condition.

3. A control system for a helicopter power plant including a gas-coupled gas turbine engine adapted for remote power control and starting and stopping of the engine and a lifting rotor driven by the engine comprising, in combination, engine control means generating a gas generator power output level command signal, load control means generating a collective pitch control signal effective to vary the power requirement of the lifting rotor, fuel control means for the engine effective to meter fuel to the engine to control engine power level, a first servomechanism operative to adjust the fuel control means in response to the power output level command signal, a second servomechanism operative to adjust the fuel control means in response to the collective pitch control signal, means responsive to the power output command signal effective to transmit a first driving signal to the first servomechanism, means responsive to the collective pitch control signal effective to transmit a second driving signal to the second servomechanism; starting means connected to the engine operable to start the engine; and a fault detecting logic system connected to the two said signal generating and the two said signal transmitting means so as to receive the four said signals operative to compare the level of each of the four said signals with a corresponding preset signal level and connected to the fuel valve closed condition verifying means, the said logic system being connected to the starting means so as to inhibit starting of the engine upon detection of an undesired level of any of the four said signals and also when the fuel valve is not in closed condition.

* * * * *